United States Patent [19]
Araki

[11] Patent Number: 6,058,083
[45] Date of Patent: May 2, 2000

[54] SERVO SIGNAL PROCESSING APPARATUS AND OPTICAL DISK APPARATUS

[75] Inventor: Kenji Araki, Chiba, Japan

[73] Assignee: Sony Corporation, Tokyo, Japan

[21] Appl. No.: 08/946,665

[22] Filed: Oct. 7, 1997

[30] Foreign Application Priority Data

Oct. 9, 1996 [JP] Japan ................................. 8-268941

[51] Int. Cl.⁷ ............................................... G11B 7/00
[52] U.S. Cl. ..................................... 369/44.36; 369/44.41
[58] Field of Search ........................... 369/44.41, 44.37, 369/44.35, 44.36, 44.29, 44.23

[56] References Cited

U.S. PATENT DOCUMENTS

| | | | |
|---|---|---|---|
| 4,707,648 | 11/1987 | Minami | 369/44.35 |
| 5,138,596 | 8/1992 | Yamada | 369/44.36 |
| 5,200,942 | 4/1993 | Hosobata et al. | 369/44.41 |
| 5,610,883 | 3/1997 | Yanagawa | 369/44.41 |
| 5,663,942 | 9/1997 | Ishibashi et al. | 369/44.36 |
| 5,715,219 | 2/1998 | Takeda et al. | 369/44.41 |

FOREIGN PATENT DOCUMENTS 60-217535 10/1985 Japan.

Primary Examiner—Thang V. Tran
Attorney, Agent, or Firm—Limback & Limback, LLP

[57] ABSTRACT

The present invention provides a servo signal processing apparatus and an optical disk apparatus in which no defocusing is caused when a focus error signal is zero.

The servo signal processing apparatus includes:

first photo-detection means for receiving a return beam reflected from a signal recording plane of a disk-shaped recording medium and outputting an electric signal; second photo-detection means for receiving the return beam and outputting an electric signal; signal correction means for correcting one of the electric signals outputted from the first photo-detection means or the second photo-detection means; and signal comparing means for comparing the electric signal outputted via the signal correction means from one of the first photo-detection means and the second photo-detection means, with the electric signal outputted from the other photo-detection means, and outputting a result of the comparison.

14 Claims, 6 Drawing Sheets

SERVO SIGNAL PROCESSING APPARATUS AND OPTICAL DISK APPARATUS

BACKGROUND OF THE INVENTION

1. Field of the Invention

The present invention relates to a servo signal processing apparatus for carrying out a focus servo by detecting a focusing state according a laser beam returned from an optical disk or an optical-magnetic disk, and an optical disk apparatus.

2. Description of the Prior Art

In a conventional optical disk apparatus for recording and/or reproducing a data signal on/from a disk-shaped recording medium such as an optical disk, a focus servo is carried out by detecting a focus error signal.

That is, the conventional optical disk apparatus applies a laser beam to an optical disk and carries out a focus servo according to a focus error signal detected from a laser beam returned from the optical disk.

Detection of a focus error signal is carried out by a focus detection device, and a focus servo is carried out by a servo signal processing apparatus provided in the optical disk apparatus.

The aforementioned focus detection device is, for example, disclosed in Japanese Patent Laid-Open Sho 60-217535. This focus detection device emits a laser beam to an optical disk and receives the laser beam reflected from a signal recording plane of the optical disk for detecting a focus error signal.

That is, as shown in FIG. 1, in the aforementioned focus detection device, a laser beam is emitted from a light source 101 and goes through a beam splitter 102 and a collimator lens 103 and is focused by an objective lens 104 onto a signal recording plane of an optical disk 105.

The laser beam reflected from the signal recording plane of the optical disk 105 goes through the objective lens 104 and the collimator lens 103 and is reflected further by the beam splitter 102 to enter a beam splitter 106.

The beam is branched in the beam splitter 106 so as to be received by a first photo-detector 107 and a second photo-detector 108.

The first photo-detector 107 and the second photo-detector 108 are arranged so as to be in an identical distance before and after a conjugate point (as a reference) of a laser focusing point of the laser beam reflected from the signal recording plane of the optical disk 105 in a just focus state.

As shown in FIG. 2, the first photo-detector 107 and the second photo-detector 108 respectively consist of three photo-detection blocks (107a, 107b, 107c, and 108a, 10b, 108c).

Here, a focus error signal is detected by comparing a total of an electric signal from the photo-detection blocks 107a and 107c of the first photo-detector 107 and an electric signal from the photo-detection block 108b of the second photo-detector 8 with a total of an electric signal from the photo-detection block 107b of the first photo-detector 107 and an electric signal from the photo-detection blocks 108a and 108c of the second photo-detector. The focus servo is carried out so as to make this focus error signal zero.

However, the aforementioned focus detection device requires two beam splitters 102 and 106 and has such a configuration that the light source 101, the beam splitters 102 and 106, and the photo-detectors 107 and 108 are arranged separately from one another. Consequently, the optical disk apparatus requires a complicated assembly in a considerably large size with a high cost.

Furthermore, an laser beam branched in the beam splitter 106 is received by the photo-detector 107 and the photo-detector 108 for detecting a focus error signal. Consequently, if any change is caused in the reflection characteristic of a reflection film formed on the beam splitter 106, the intensity of beam detected by the photo-detectors 107 and 108 is greatly affected.

Therefore, if any irregularities are contained during a manufacturing of the beam splitter 106, irregularities are also contained in the intensity of the beam received by the photo-detector 107 and in the intensity of the beam received by the photo-detector 108. This means that, for example, just focus cannot be obtained even if the focus error signal is zero.

That is, even if focus servo functions so as to make the focus error signal zero, defocusing is caused and a data signal recorded or reproduced to/from the optical disk is deteriorated.

SUMMARY OF THE INVENTION

It is therefore an object of the present invention to provide a servo signal processing apparatus and an optical disk apparatus in which defocusing is not caused when the focus error signal is zero.

DETAILED DESCRIPTION OF PREFERRED EMBODIMENTS

Description will now be directed to embodiments of the present invention with reference to the attached drawings.

A servo signal processing apparatus according to a first embodiment of the present invention emits a laser beam, detects a focus error signal according to the laser beam reflected from an optical disk, and carries out focusing according to a focus servo signal corresponding to the focus error signal.

Figure 1:
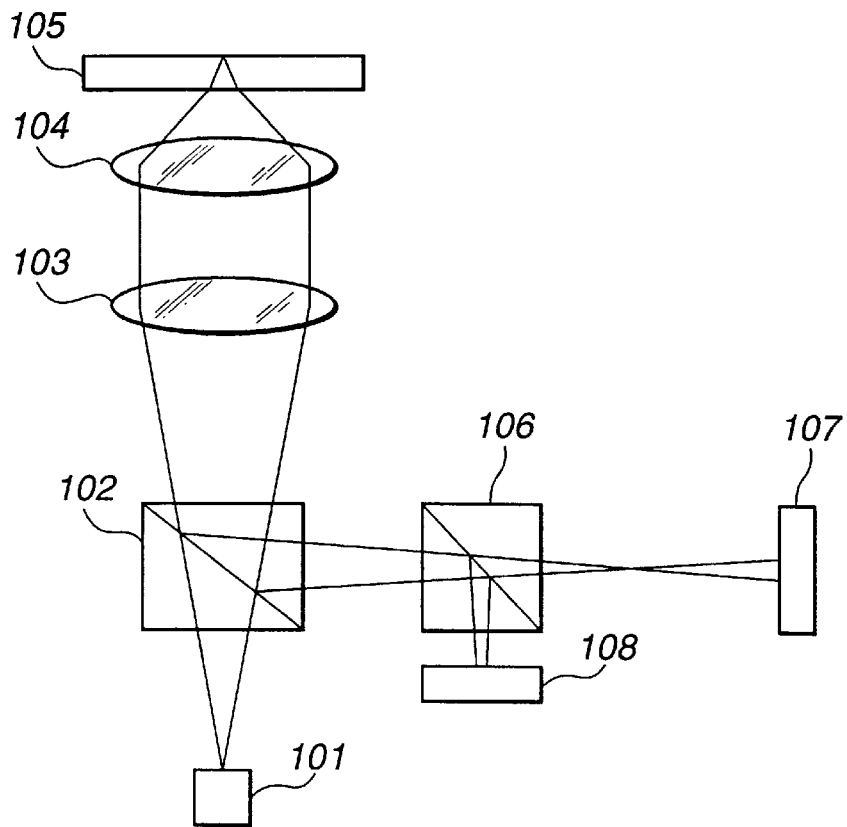
FIG. 1 is a block diagram showing a conventional focus detection apparatus.
Figure 2:
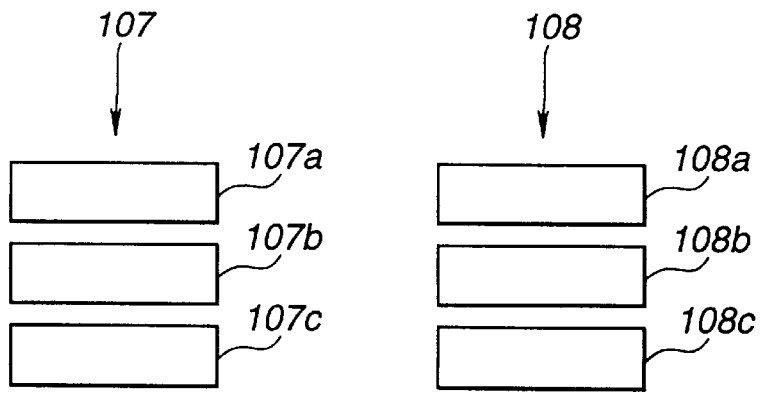
FIG. 2 is a block diagram showing photo-detectors of the conventional focus detection apparatus.
Figure 3:
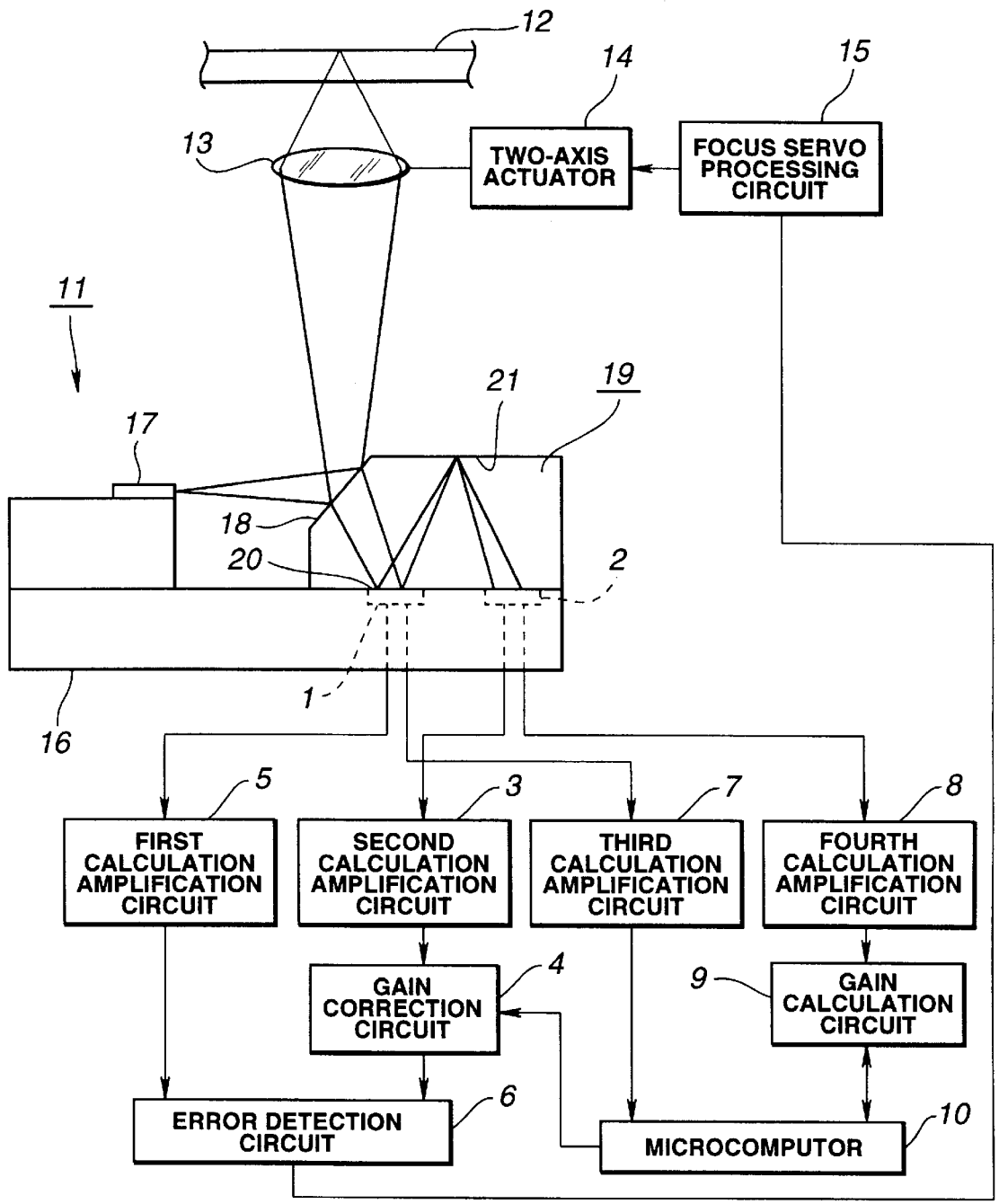
FIG. 3 is a block diagram showing a servo signal processing apparatus according to an embodiment of the present invention.

FIG. 3 is a block diagram showing a configuration of this servo signal processing apparatus including: a first photo-detector 1 which receives a return beam from an optical disk 12 and outputs an electric signal; a second photo-detector which receives the return beam and outputs an electric signal; a first calculation amplification circuit 5; a second calculation amplification circuit 3; a gain correction circuit 4 which corrects the electric signal supplied via the second calculation amplification circuit 3 from the second photo-detector 2; and an error detection circuit 6 which compares the electric signal outputted from the gain correction circuit 4 to the electric signal supplied via the first calculation amplification circuit 5 from the first photo-detector 1, and outputs a result of the comparison.

The servo signal processing apparatus further includes: a third calculation amplification circuit 7; a fourth calculation amplification circuit 8 which is supplied with an electric signal outputted from the second photo-detector 2; a gain calculation circuit 9 which is supplied with an electric signal outputted from the fourth calculation amplification circuit 8; and a microcomputer 10 which controls gains of the gain calculation circuit 9 and of the gain correction circuit 4 according to electric signals outputted from the gain calculation circuit 9 and the third calculation amplification circuit 7.

Furthermore, the servo signal processing apparatus includes a micro prism detector 11 which is provided with the first photo-detector 1 and the second photo-detector 2; an objective lens, into which the laser beam is introduced so as to be focused on a signal recording plane of an optical disk 12; a two-axis actuator 14 for moving the objective lens 13 in a focusing direction and a tracking direction; and a focus servo processing circuit for controlling the two-axis actuator 14 according to a focus error signal outputted from the error detection circuit 6.

The micro prism detector 11 is composed of various optical devices which are normally provided in an optical pickup apparatus and which are integrated into a small size, enabling a cost reduction. The micro prism detector 11 includes a substrate 16, a semiconductor laser 17 for emitting a laser beam, and a prism 19 having a reflection plane 18 formed so as to orient the laser beam toward the optical disk 12.

A return beam from the optical disk 12 goes through the reflection plane 18 and is received by the first photo-detector 1 and the second photo-detector 2 arranged on the substrate 16 of the micro prism detector 11. A semi-transparent reflection plane 20 is formed to cover the side of the first photo-detector 1 facing the prism 19. This semi-transparent reflection plane 20 has such an optical characteristic that 50% of the return beam which comes through the reflection plane 18 is introduced into the first photo-detector 1 and another 50% is reflected by this semi-transparent reflection plane 20.

The prism 19 is provided with an opposing reflection plane 21. This opposing reflection plane 21 is formed on the prism 19 at a conjugate point of a focusing point of the beam introduced through the reflection plane 18 and reflected from the semi-transparent plane 20.

Figure 4:
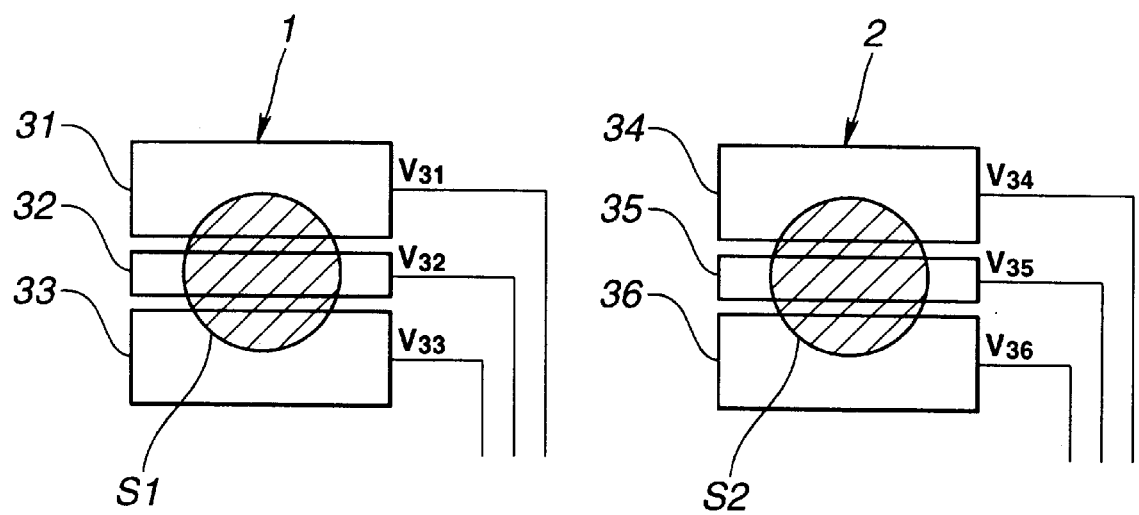
FIG. 4 is a block diagram showing photo-detectors according to the embodiment of the present invention.

As shown in FIG. 4, the aforementioned first photo-detector is composed of three photoelements 31, 32, and 33, each made of a photodiode or the like having a rectangular shape. The three photoelements 31, 32, and 33 outputs electric signals V31, V32, and V33, respectively according to the received light.

In the same way as the first photo-detector 1, the second photo-detector is formed from three light-intercepting devices 34, 35, and 36, each made of a photodiode or the like having a rectangular shape. The three light-intercepting devices 34, 35, and 36 outputs electric signals V34, V35, and V36, respectively according to the intercepted light.

The return beam from the optical disk 12, for example, forms a stop sl and a spot s2 on the first photo-detector 1 and the second photo-detector 2, respectively.

The electric signals outputted from the photo-detectors 1 and 2 are supplied to the calculation amplification circuits 3, 5, 7, and 8.

Figure 5:
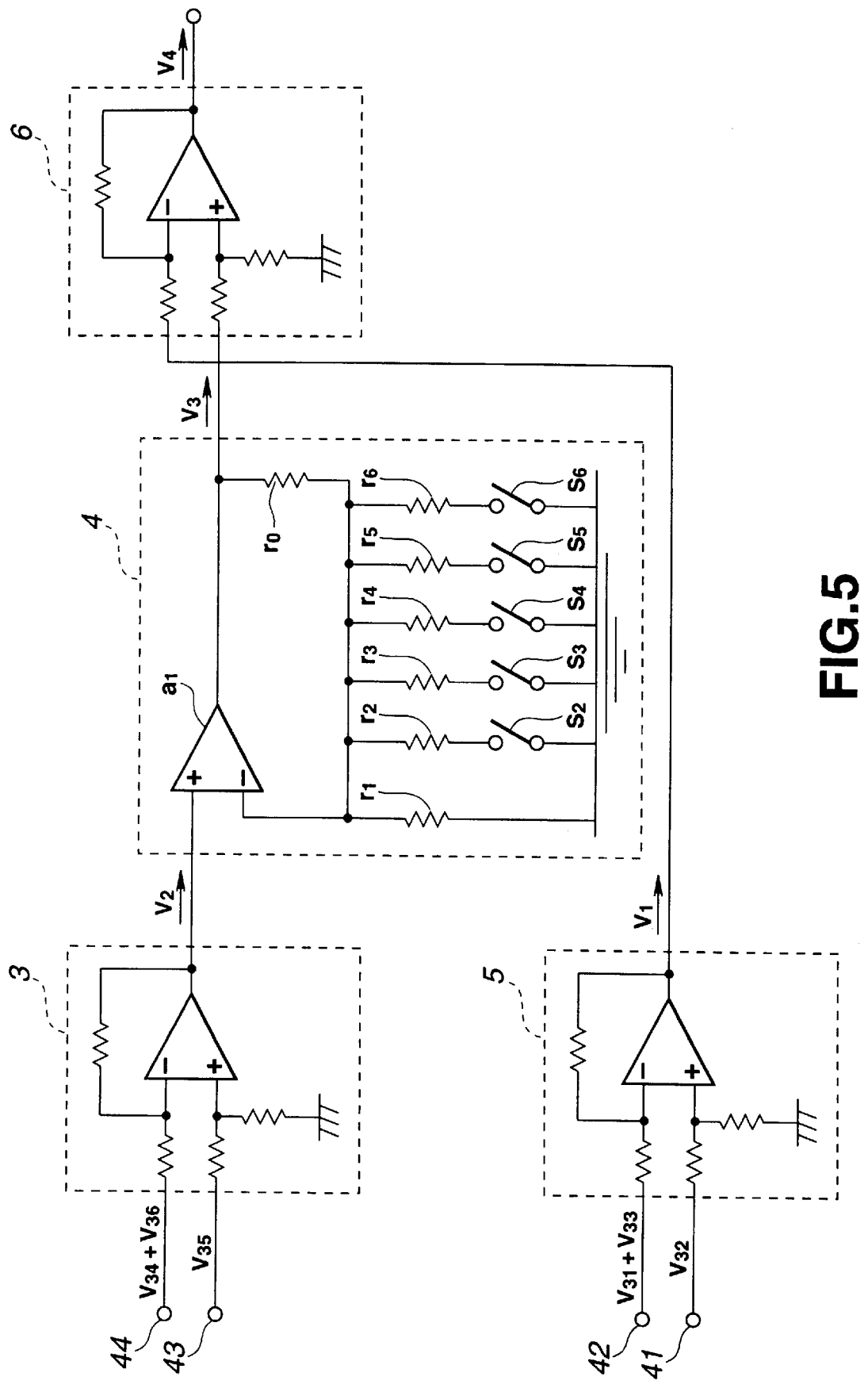
FIG. 5 is a block diagram showing a gain correction circuit according to the embodiment.

As shown in FIG. 5, the first calculation amplification circuit 5 has terminals 41 and 42, and is supplied with the electric output signal V32 of the first photo-detector 1 through the terminal 41 and the electric output signals V31+V33 of the first photo-detector 1 through the terminal 42. Supplied with these signals, the first calculation amplification circuit 5 outputs an electric signal V1 as follows.

$$V1=V32-(V31+V33)$$

On the other hand, the second calculation amplification circuit 5 has terminals 43 and 44, and is supplied with the electric output signal V35 of the second photo-detector 2 through the terminal 43 and the electric output signals V34+V36 of the second photo-detector 2 through the terminal 44. Supplied with these signals, the second calculation amplification circuit 3 outputs an electric signal V2 as follows.

$$V2=V35-(V34+V36)$$

The electric signal V2 is supplied to the gain correction circuit 4.

It should be noted that the first calculation amplification circuit 5 and the second calculation amplification circuit 3 has an identical gain.

The gain correction circuit 4 consists of a calculation amplification circuit a1, a resistor r0, a grounded resistor r1, and a set of resistors r2, r3, r4, r5, and r6 which are grounded in parallel through switches S2, S3, S4, S5, and S6, respectively. For example, resistors r2, r3, r4, r5, and r6 have an identical resistance value.

The switches S2, S3, S4, S5, and S6 are turned on and off by the microcomputer 10 which will be detailed later.

An electric signal V3 outputted from the gain correction circuit 4 and the electric signal V1 outputted from the first calculation amplification circuit 5 are supplied to the error detection circuit 6.

The error detection circuit 6 compares the electric signal V1 to the electric signal V3 and outputs an electric signal V4 as follows.

$$V4=(V31+V33+V35)-(V32+V34+V36)$$

The servo signal processing apparatus uses this electric signal V4 as a focus error signal for carrying out a focus servo.

Figure 6:
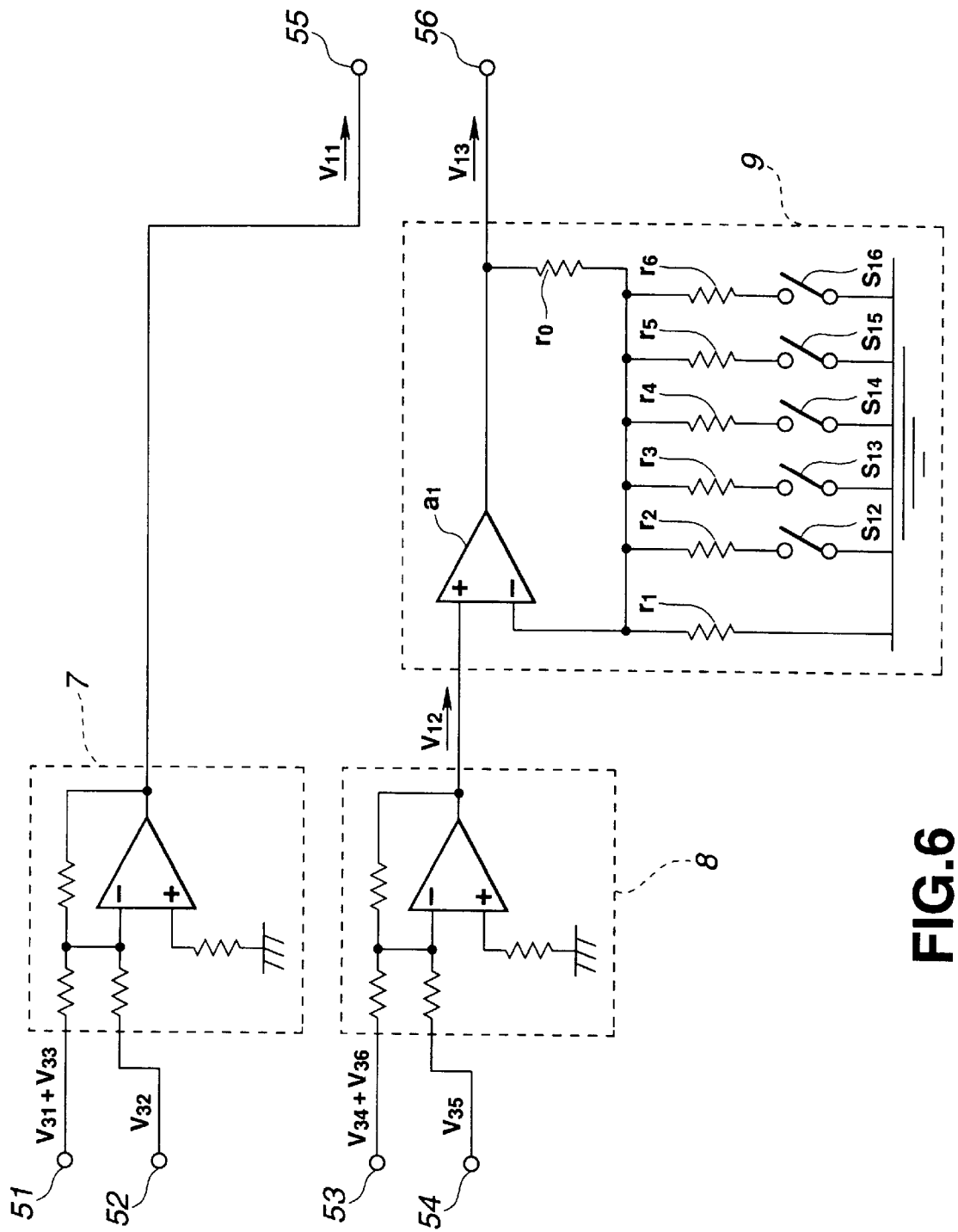
FIG. 6 is a gain calculation circuit according to the embodiment.

As shown in FIG. 6, the third calculation amplification circuit 7 has terminals 51 and 52, and is supplied with the electric output signal V31+V33 of the first photo-detector 1 through the terminal 51 and the electric output signals V32 of the first photo-detector 1 through the terminal 52. Supplied with these signals, the third calculation amplification circuit 7 outputs an electric signal V11 as follows.

$$V11=V31+V32+V33$$

On the other hand, the fourth calculation amplification circuit 8 has terminals 53 and 54, and is supplied with the electric output signal V34+V36 of the second photo-detector 2 through the terminal 53 and the electric output signals V35 of the second photo-detector 2 through the terminal 54. Supplied with these signals, the second calculation amplification circuit 8 outputs an electric signal V12 as follows.

$$V12=V34+V35+V36$$

The electric signal V12 is supplied to the gain calculation circuit 9.

It should be noted that the third calculation amplification circuit 7 and the fourth calculation amplification circuit 8 has an identical gain.

The gain correction circuit 9 has an identical configuration as the gain correction circuit 4. That is, the gain correction circuit 9 consists of a calculation amplification circuit a1, a resistor r0, a grounded resistor r1, and a set of resistors r2, r3, r4, r5, and r6 which are grounded in parallel through switches S12, S13, S14, S15, and S16, respectively. This gain calculation circuit 9 changes a gain of the electric signal V12 supplied and outputs an electric signal V13.

An output terminal 56 which outputs the electric signal V13 and an output terminal 55 which outputs the electric signal V11 from the third calculation amplification circuit 7 are both connected to the microcomputer 10.

The microcomputer 10 compares the electric signal V11 with V13 which are supplied from the output terminals 55 and 56, and according to a result of this comparison, controls on/off of the switches S12, S13, S14, S15 and S16 of the gain calculation circuit 9 and the switches S2, S3, S4, S5, and S6 of the gain correction circuit 4. For this control, the microcomputer 10 simultaneously and similarly controls the switches S12, S13, S14, S15, and S16 of the gain calculation circuit 9 and the switches S2, S3, S4, S5 and S6 of the gain correction circuit 4.

That is, the gain correction circuit 4 outputs the electric signal V3 to the error detection circuit 6 with its switches S2, S3, S4, S5, and S6 controlled by the microcomputer 10. The error detection circuit 6 compares the electric signal V1 to the electric signal V3 whose gain is controlled according to the result of comparison between the electric signals V11 and V13, and outputs a focus error signal. According to this focus error signal, the focus servo processing circuit 15 carries out a focus servo.

The servo signal processing apparatus having the aforementioned configuration carries out a focus servo according to a return beam from an optical disk.

That is, the servo signal processing apparatus emits a laser beam from the semiconductor laser 17 when carrying out a focus servo. This laser beam is reflected by the reflection plane 18 and goes to the objective lens 13.

The laser beam goes through the objective lens 13 and is focused on the signal recording plane of the optical disk 12. The laser beam reflected from the signal recording plane goes as a return beam through the objective lens 13 and into the reflection plane 18.

The return beam goes through the reflection plane 18 to the semi-transparent reflection plane 20. A portion of the return beam which goes through this semi-transparent reflection plane 20 is received by the first photo-detector 1, whereas the rest of the return beam which is reflected by the semi-transparent reflection plane 20 goes to the opposing reflection plane 21, where the return beam is reflected so as to be received by the second photo-detector 2.

The photoelements 31, 32, and 33 of the first photo-detector 1 output electric signals V31, V32, and V33, respectively, according to an received beam, whereas the photoelements 34, 35, and 36 of the second photo-detector 2 output electric signals V34, V35, and V36, respectively, according to an received beam.

The electric signals V31, V32, V33, V34, V35, and V36 are supplied to the calculation amplification circuits 3, 5, 7, and 8.

The third calculation amplification circuit 7 is supplied with the electric signals V31 +V33 through the terminal 51, and with the electric signal V32 through the terminal 52. This third calculation amplification circuit 7 outputs the aforementioned electric signal V11 as a result of the calculation.

On the other hand, the fourth calculation amplification circuit 8 is supplied with the electric signals V34+V36 through the terminal 53, and with the electric signal V35 through the terminal 54. This fourth calculation amplification circuit 8 outputs the aforementioned electric signal V12 as a result of the calculation.

Furthermore, this electric signal V12 is outputted through the gain calculation circuit 9 as an electric signal V13.

The electric signal V13 and the electric signal V11 are supplied to the microcomputer 10. The microcomputer 10 compares the electric signal V11 to the electric signal V13. If any difference is found between the electric signal V11 and the electric signal V13, the microcomputer 10 turns on or off the switches S12, S13, S14, S15, and S16 according to the difference.

For example, the switches S12, S13, S14, S15, and S16 are kept off until a return beam is received, and the microcomputer 10 controls to turn on the switches successively from the switch S2 or from the switch S6 according to the condition.

The control to turn on or off the switches is continued until the electric signal V11 and the electric signal V13 come to have identical values.

On the other hand, the first calculation amplification circuit 5 is supplied with the electric signal V32 through the terminal 41 and with the electric signals V31+V33 through the terminal 42. This first calculation amplification circuit 5 outputs the aforementioned electric signal V1 after the calculation.

Furthermore, the second calculation amplification circuit 3 is supplied with the electric signal V35 through the terminal 43 and with the electric signals V34+V36 through the terminal 44. This second calculation amplification circuit 3 outputs the aforementioned electric signal V2 after the calculation.

The electric signal V2 is supplied to the gain correction circuit 4 having the switches S2, S3, S4, S5, and S6 controlled in the same way as the switches S12, S13, S14, S15, and S16 of the gain calculation circuit 9 which are controlled by the microcomputer 10. The electric signal V2 is outputted through the gain correction circuit 4 as the electric signal V3.

That is, the electric signal V3 is corrected by the gain correction circuit 4 in the same way as a correction that the electric signal V13 outputted from the gain calculation circuit 9 is corrected so as to have an identical value with the electric signal V11 outputted from the calculation amplification circuit 7.

The electric signal V3 which has been subjected to the aforementioned correction and the electric signal V1 outputted from the first calculation amplification circuit 5 are supplied to the error detection circuit 6. This error detection circuit 6 outputs a focus error signal V4 according to the electric signal V1 and the electric signal V3 supplied.

The servo signal processing apparatus carries out a focusing by the focus servo processing circuit 15 so as to make zero the focus error signal V4.

Consequently, even if there are irregularities in the reflectance of the semi-transparent reflection plane 20 or the opposing reflection plane 21 of the prism 19, the irregularities are compensated by the microcomputer 10 which controls the switches of the gain calculation circuit 9 so that the electric signal V11 and the electric signal V13 have an identical value. That is, the microcomputer carries out a control equivalent to an operation to make the total of the beams received by the first photo-detector 1 identical to the total of the beams received by the second photo-detector 2.

Simultaneously with this, the switches of the gain correction circuit 4 are also controlled by the microcomputer. Consequently, the electric signal V3 becomes an electric signal in which the aforementioned irregularities of the reflectance have been corrected.

As has been described, the servo signal processing apparatus is capable of detecting a focus error signal according to an electric signal in which irregularities of the reflectance of the semi-transparent reflection plane 20 or the opposing reflection plane 21, if any, have been compensated. Consequently, the servo signal processing apparatus can prevent defocusing even if there is any irregularity in the reflectance of the semi-transparent reflection plane 20 or the opposing reflection plane 21 and accordingly, can make a just focus when the focus error signal is zero.

Description will now be directed to an optical disk apparatus according to a second embodiment of the present invention.

This optical disk apparatus includes a focus servo signal processing apparatus 71 which detects a focus error signal according to a return beam from an optical disk and carries out a focus servo according to the focus error signal. This focus servo signal processing apparatus 71 has an identical configuration as the servo signal processing apparatus according to the aforementioned first embodiment.

Figure 7:
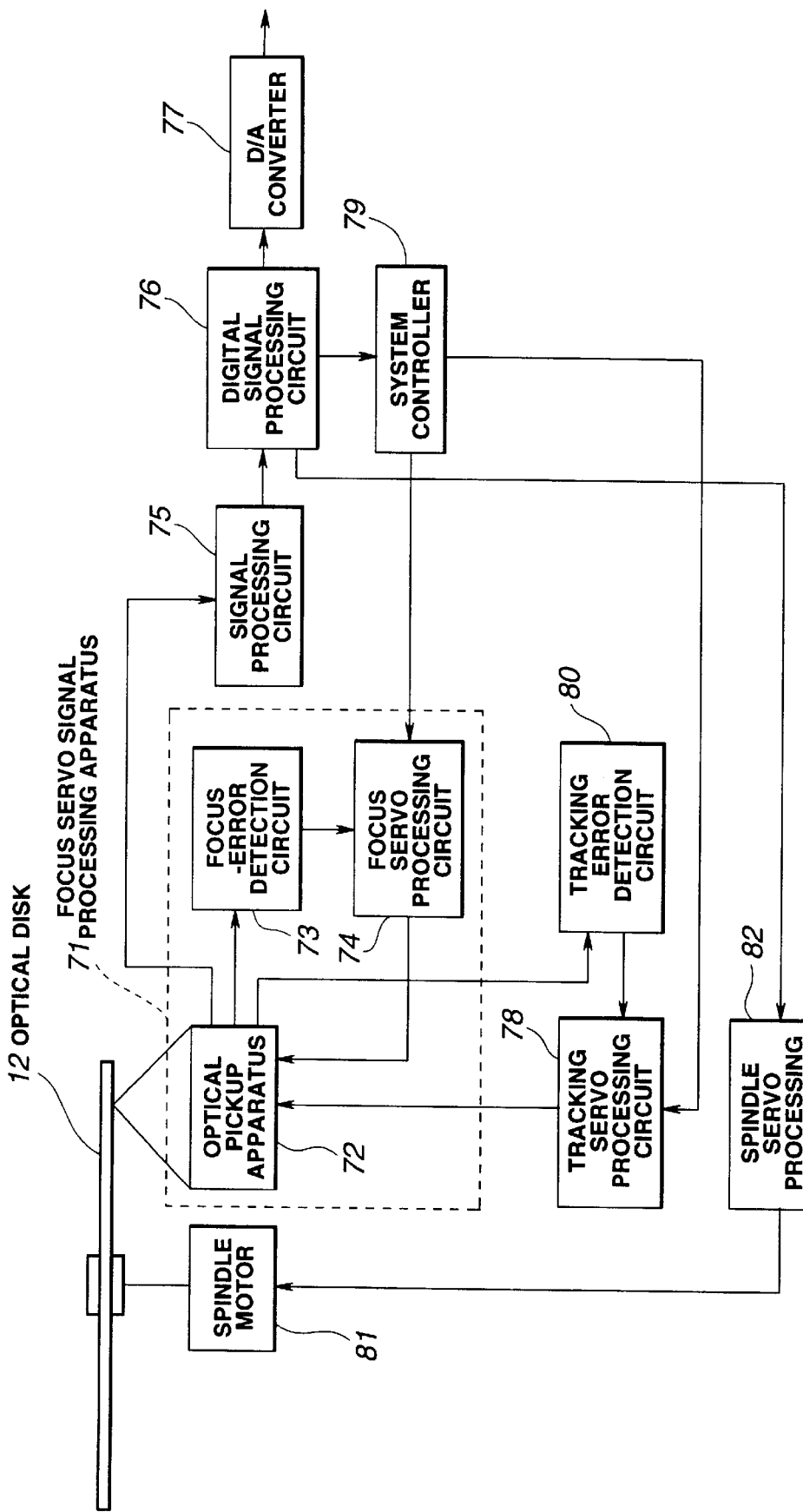
FIG. 7 is an optical disk apparatus according to another embodiment of the present invention.

As shown in FIG. 7, the focus servo signal processing apparatus 71 consists of an optical pickup apparatus 72 which emits a laser beam to a signal recording plane of an optical disk 12 and receives the beam returned; a focus error detection circuit 73 for detecting a focus error signal; and a focus servo processing circuit for moving a two-axis actuator provided in the optical pickup apparatus 72, in the focusing direction, according to the focus error signal. The focus servo processing circuit 74 is controlled by a system controller 79.

The aforementioned pickup apparatus 72 consists of the micro prism detector 11, the objective lens 13 and the two-axis actuator 14 shown in FIG. 3.

The focus error detection circuit 73 consists of a first calculation amplification circuit 5; a second calculation amplification circuit 3; a third calculation amplification circuit 7; a fourth calculation amplification circuit 8; a gain correction circuit 4; a gain calculation circuit 9; an error detection circuit 6; and a microcomputer 10.

As shown in FIG. 7, the optical disk apparatus includes: a signal processing circuit 75 for rectifying electric signals outputted from photo-detectors 1 and 2 provided in the optical pickup apparatus 72; a digital signal processing circuit 76 for converting into a digital signal an electric signal supplied; a D/A converter for converting into an analog signal an electric signal supplied; a system controller 79 for controlling the focus servo processing circuit 74 and a tracking servo processing circuit 78 according to a digital signal supplied; a tracking servo processing circuit 78 for carrying out a tracking by controlling the two-axis actuator 14 provided in the optical pickup apparatus 72; a tracking error detecting circuit 80 for detecting a tracking error signal according to electric signals outputted from the photo-detectors 1 and 2; a spindle motor 81 for rotating the optical disk 12; and a spindle servo processing circuit for rotating the spindle motor 81 according to a signal outputted from the digital signal processing circuit 76.

The optical pickup apparatus 72 emits a laser beam which is reflected from a signal recording plane of an optical disk 12 and supplied as a return beam to a micro prism detector 11 provided in the optical pickup apparatus 72.

As shown in FIG. 3, the return beam coming into the micro prism detector 11 is received through the semi-transparent reflection plane 20 by the first photo-detector 1. On the other hand, the beam which has been reflected by the semi-transparent plane 20 is further reflected by the opposing reflection plane 21 and received by the second photo-detector 2.

The photo-detectors 1 and 2 respectively output electric signals according to the beams received. These electric signals are supplied to the focus error detection circuit 73, the tracking error detection circuit 80 and the signal processing circuit 75.

As has been explained in the aforementioned first embodiment, the focus error detection circuit 73 detects a focus error signal in which a correction has been made so as to make the total of the beams received by the first photo-detector 1 is identical to the total of beams received by the second photo-detector 2, and outputs the focus error signal. The focus servo processing circuit 74 carries out a focusing according to this focus error signal.

On the other hand, the tracking error detection circuit 80 detects and outputs a tracking error signal according to electric signals outputted from the photo-detectors 1 and 2. The tracking servo processing circuit 78 carries out a tracking according to this tracking error signal.

The electric output signals supplied to the signal processing circuit 75 are converted into a digital signals in the digital signal circuit 76 and outputted through the D/A converter 77 as a sound, for example.

The spindle servo processing circuit 82 controls the rotation of the spindle motor 81 according to a control signal outputted from the digital signal processing circuit 76. Thus, the optical disk 12 is rotated by the spindle motor 81.

Thus, the aforementioned optical disk apparatus enables one to carry out a focus servo and a tracking servo simultaneously with carrying out a recording or reproduction of a data signal onto/from an optical disk.

In the optical disc apparatus as has been described, even if there is any irregularity in the semi-transparent reflection plane 20 and the opposing reflection plane 21, an electric signal to compensate the irregularity is detected as a focus error signal. This prevents a defocusing. Consequently, the optical disk apparatus is capable of recording and/or reproducing a data signal with the least deterioration.

Note that in the servo signal processing apparatus and the optical disk apparatus according to the present invention, it is possible to employ a variable resistor instead of the resistors r2, r3, r4, r5, and r6 provided in the gain correction circuit 4 and the gain calculation circuit 9. In such a case, the microcomputer 10 controls so that a resistance of the variable resistor provided in the gain correction circuit 4 is identical to a resistance of the variable resistor provided in the gain calculation circuit 9.

Moreover, in the servo signal processing apparatus and the optical disk apparatus according to the present invention, it is possible to provide the gain correction circuit 4 and the gain calculation circuit 9 at the electric signal output side of the first calculation amplification circuit 5 and the third calculation amplification circuit 7.

Furthermore, in the servo signal processing apparatus and the optical disk apparatus according to the present invention, it is possible that each of the first photo-detector 1 and the second photo-detector 2 is made from a signal photoelement.

In the servo signal processing apparatus and the optical disk apparatus according to the present invention, it is possible to prevent defocusing by comparing a beam quantity received by the first photo-detection means to a beam quantity received by the second photo-detection means.

What is claimed is:

1. A servo signal processing apparatus comprising:

first photo-detection means for receiving a return beam reflected from a signal recording plane of a disk-shaped recording medium and outputting a first electric signal;

second photo-detection means for receiving said return beam and outputting a second electric signal;

signal correction means for correcting one of said first electric signal and said second electric signal and outputting a corrected electric signal; and signal comparing means for comparing the corrected electric signal with another one of the first electric signal and the second electric signal, and outputting a result of the comparison, wherein said signal correction means corrects said one of said first electric signal and said second electric signal with a correction value equivalent to a value which makes a first total of beams received on a plurality of beam receiving planes of said first photo-detection means to be identical with a second total of beams received on a plurality of beam receiving planes of said second photo-detection means.

2. A servo signal processing apparatus as claimed in claim 1, wherein said signal correction means comprises a variable gain amplifier connected to one of an output side of said first photo-detection means and an output side of said second photo-detection means.

3. An optical disk apparatus comprising:

first photo-detection means for receiving a return beam reflected from a signal recording plane of a disk-shaped recording medium and outputting a first electric signal;

second photo-detection means for receiving said return beam and outputting a second electric signal;

signal correction means for correcting one of said first electric signal and said second electric signal and outputting a corrected electric signal; and signal comparing means for comparing the corrected electric signal with another one of the first electric signal and the second electric signal and outputting a result of the comparison, wherein said signal correction means corrects said one of said first electric signal and said second electric signal with a correction value equivalent to a value which makes a first total of beams received by a plurality of photoelements of said first photo-detection means identical to a second total of beams received by a plurality of photoelements of said second photo-detection means.

4. An optical disk apparatus as claimed in claim 3, wherein said signal correction means comprises a variable gain amplifier connected to one of an output of said first photo-detection means and an output of said second photo-detection means.

5. An optical disk apparatus comprising:

first and second photoelement sections each having a plurality of photoelements for receiving a return beam reflected from a signal recording plane of a disk-shaped recording medium;

first photo-detection means for outputting a first electric signal according to a first photo signal supplied from said first photoelement section and said second photoelement section;

second photo-detection means for outputting a second electric signal according to a second photo signal supplied from said first photoelement section and said second photoelement section;

signal correction means for correcting one of the first electric signal and the second electric signal and outputting a corrected electric signal;

signal comparison means for comparing the corrected electric signal with another one of the first electric signal and the second electric signal and for outputting a result of the comparison; and an optical pickup apparatus which moves an objective lens in a direction parallel to a lens optical axis according to said result of the comparison, wherein said signal correction means corrects said one of said first electric signal and said second electric signal with a correction value equivalent to a value which makes a first total of beams received by the plurality of photoelements of said first photoelement section identical to a second total of beams received by the plurality of photoelements of said second photoelement section.

6. An optical disk apparatus as claimed in claim 5, wherein said signal correction means corrects said one of said first electric signal and said second electric signal with a variable gain amplifier connected to one of an output of said first photo-detection means and an output of said second photo-detection means.

7. A servo signal processing method comprising the steps of:

a first photo detection step of receiving a return beam reflected from a signal recording plane of a disk-shaped recording medium and outputting a first electric signal;

a second photo detection step of receiving said return beam and outputting a second electric signal;

correcting one of said first electric signal and said second electric signal and outputting a corrected electric signal; and comparing the corrected electric signal with another one of the first electric signal and the second electric signal, and outputting a result of the comparison, wherein said correcting step corrects said one of said first electric signal and said second electric signal with a correction value equivalent to a value which makes a first total of beams received on a plurality of beam receiving planes in said first photo-detection step to be identical with a second total of beams received on a plurality of beam receiving planes in said second photo-detection step.

8. A method of controlling an optical disc apparatus, comprising the steps of:

receiving a return beam reflected from a signal recording plane of a disk-shaped recording medium;

outputting a first electric signal according to a first photo signal supplied from a first photoelement section and a second photoelement section;

outputting a second electric signal according to a second photo signal supplied from said first photoelement section and said second photoelement section;

correcting one of the first electric signal and the second electric signal and outputting a corrected electric signal;

comparing the corrected electric signal with another one of the first electric signal and the second electric signal and outputting a result of the comparison; and moving an objective lens in a direction parallel to a lens optical axis according to said result of the comparison, wherein said correcting step corrects said one of said first electric signal and said second electric signal with a correction value equivalent to a value which makes a first total of beams received by a plurality of photoelements of said first photoelement section identical to a second total of beams received by a plurality of photoelements of said second photoelement section.

9. A servo signal processing apparatus comprising:

a first photo-detector for receiving a return beam reflected from a signal recording plane of a disk-shaped recording medium and outputting a first electric signal;

a second photo-detector for receiving said return beam and outputting a second electric signal;

a gain correction circuit for correcting one of said first electric signal and said second electric signal and outputting a corrected electric signal; and an error detection circuit for comparing the corrected electric signal with another one of the first electric signal and the second electric signal, and outputting a result of the comparison, wherein said gain correction circuit corrects said one of said first electric signal and said second electric signal with a correction value equivalent to a value which makes a first total of beams received on a plurality of beam receiving planes of said first photo-detector to be identical with a second total of beams received on a plurality of beam receiving planes of said second photo-detector.

10. A servo signal processing apparatus as claimed in claim 9, wherein said gain correction circuit comprises a variable gain amplifier connected to one of an output side of said first photo-detector and an output side of said second photo-detector.

11. An optical disk apparatus comprising:

a first photo-detector for receiving a return beam reflected from a signal recording plane of a disk-shaped recording medium and outputting a first electric signal;

a second photo-detector for receiving said return beam and outputting a second electric signal;

a gain correction circuit for correcting one of said first electric and said second electric signal and outputting a corrected electric signal; and an error detection circuit for comparing the corrected electric signal with another one of the first electric signal and the second electric signal and outputting a result of the comparison, wherein said gain correction circuit corrects said one of said first electric signal and said second electric signal with a correction value equivalent to a value which makes a first total of beams received by a plurality of photoelements of said first photo-detector identical to a second total of beams received by a plurality of photoelements of said second photo-detector.

12. An optical disk apparatus as claimed in claim 11, wherein said gain correction circuit comprises a variable gain amplifier connected to one of an output of said first photo-detector and an output of said second photo-detector.

13. An optical disk apparatus comprising:

first and second photoelement sections each having a plurality of photoelements for receiving a return beam reflected from a signal recording plane of a disk-shaped recording medium;

a first photo-detector for outputting a first electric signal according to a first photo signal supplied from said first photoelement section and said second photoelement section;

a second photo-detector for outputting a second electric signal according to a second photo signal supplied from said first photoelement section and said second photoelement section;

a gain correction circuit for correcting one of the first electric signal and the second electric signal and outputting a corrected electric signal;

an error detection circuit for comparing the corrected electric signal with another one of the first electric signal and the second electric signal and outputting a result of the comparison; and an optical pickup apparatus which moves an objective lens in a direction parallel to a lens optical axis according to said result of the comparison, wherein said gain correction circuit corrects said one of said first electric signal and said second electric signal with a correction value equivalent to a value which makes a first total of beams received by the plurality of photoelements of said first photoelement section identical to a second total of beams received by a plurality of photoelements of said second photoelement section.

14. An optical disk apparatus as claimed in claim 13, wherein said gain correction circuit corrects said one of said first electric signal and said second electric signal with a variable gain amplifier connected to one of an output of said first photo-detector and an output of said second photo-detector.

* * * * *